United States Patent
Murillo

(10) Patent No.: US 7,347,429 B2
(45) Date of Patent: Mar. 25, 2008

(54) TOTE DEVICE HAVING A DISTRIBUTED WEIGHT LOAD FOR REDUCING THE TOTAL WEIGHT LOAD BORNE BY A USER

(75) Inventor: Lorenzo Murillo, Newhall, CA (US)

(73) Assignee: California Diving Company, LLC, Santa Clarita, CA (US)

( * ) Notice: Subject to any disclaimer, the term of this patent is extended or adjusted under 35 U.S.C. 154(b) by 421 days.

(21) Appl. No.: 11/078,036

(22) Filed: Mar. 11, 2005

(65) Prior Publication Data
US 2006/0119058 A1    Jun. 8, 2006

Related U.S. Application Data

(60) Provisional application No. 60/553,809, filed on Mar. 17, 2004.

(51) Int. Cl.
B62B 1/24 (2006.01)
(52) U.S. Cl. ............... 280/47.17; 280/47.131
(58) Field of Classification Search ........... 280/47.131, 280/47.15, 47.16, 47.17, 47.18, 47.19, 47.2, 280/47.21
See application file for complete search history.

(56) References Cited

U.S. PATENT DOCUMENTS

| 5,074,571 | A | * | 12/1991 | Reese ...................... 280/47.19 |
| 5,207,723 | A | * | 5/1993 | Newby, Sr. ............. 312/249.11 |
| 5,433,230 | A | | 7/1995 | Miller |
| 5,492,346 | A | | 2/1996 | Stadler et al. |
| 6,341,789 | B1 | | 1/2002 | Checa et al. |
| 6,520,514 | B2 | * | 2/2003 | Clegg ...................... 280/47.26 |

* cited by examiner

Primary Examiner—Christopher P. Ellis
Assistant Examiner—John D Walters
(74) Attorney, Agent, or Firm—Catalyst Law Group; Timothy W. Fitzwilliam

(57) ABSTRACT

A tote device comprising a compartment for storing recreational equipment and a strategically located holding mechanism for the placing of weighty objects, wherein said strategically located holding mechanism is placed such that the weight of a weighty object is distributed to lessen the weight load borne by a user. The strategically located holding mechanism is preferably a platform attached outside of the compartment. When a weighty object is placed on the strategically located holding mechanism and the tote device is in position for transporting the recreational equipment to a remote location, the strategic placement of the weighty recreational equipment will act to reduce the weight burden borne by the user.

22 Claims, 8 Drawing Sheets

TOTE DEVICE HAVING A DISTRIBUTED WEIGHT LOAD FOR REDUCING THE TOTAL WEIGHT LOAD BORNE BY A USER

RELATED APPLICATION

Benefit of priority under 35 U.S.C. 119(e) is claimed herein to U.S. Provisional Application No.: 60/553,809, filed Mar. 17, 2004. The disclosure of the above referenced application is incorporated by reference in its entirety herein.

FIELD OF THE INVENTION

This invention relates generally to the field of transporting recreational equipment across a variety of terrains to a remote location.

BACKGROUND

Recreational sports frequently take place in a variety of locations, many of which lack smooth paved access roads or trails. The lack of easy access poses a problem, in that the participant will have to make numerous trips to carry any necessary equipment to a desired location. This problem of access is amplified for both equipment intensive sports and sports having heavy equipment, such as scuba diving. Scuba diving requires at a minimum that the participant use scuba tanks, which can weigh between 25 and 60 pounds. Also for example, is paintball, which at the minimum requires that users transport the necessary equipment for participating in the sport. In addition to the gun and paintballs, users will often have protective face wear, a set of clothes and an air refill tank. Because the paintball guns operate using compressed air, it is desirable to have compressed air tanks for recharging the pressure in the gun. These tanks are again, very heavy, weighing between 25 and 60 pounds or more depending on their capacity.

There are some devices in the prior art that seek to ease the burden of transporting numerous loads of recreational equipment to a remote location. For example, U.S. Pat. No. 6,341,789 issued to Checa et al is generally directed to a two wheeled cart for transporting scuba diving equipment. The cart is an elongated planar sheet having wheels, a base, a handle, and slotted openings for gear bag straps. A gear bag sits on the base and is strapped to a first side of the planar sheet. A scuba tank 13 can be placed on the second side of the planar sheet, and sits on a support member. The scuba tank 13 is strapped to the second side of the planar sheet, opposite the gear bag. (as shown in FIGS. 1A and 1B) In use, the device is tipped along its wheel axis similar to a hand truck used by furniture movers, and the device is pulled to a remote location using the handle. The device; however, is burdensome to use and transporting weighty objects such as a scuba tank can become tiresome and laborious. A user of the prior art device will have to assemble the device by placing the gear bag and the scuba tanks onto the planar sheet of the device. The user will then have to deal with numerous straps in attaching the gear bag to the device. Furthermore, as is illustrated in FIGS. 1A and 1B, the placement of the weighty objects is in a position relative to pivot point 11 wherein the full weight of said weighty object, which in the case of scuba tanks is as much as 60 pounds, is carried by the user (see the load indicator arrow 52). This type of placement makes transporting weighty objects over a long distance or over rough terrain particularly tiresome and laborious. Arrow 51 shows the direction of lift.

Other devices existing in the art also have one or more of these same problems. U.S. Pat. No. 5,433,230 issued to Miller, is directed towards an equipment container comprising a box with wheels, and a handle. The Miller device eliminates the burden of having to attach a separate gear bag using a plurality of straps by substituting in its place an equipment container. The cavity of the container is useful for storing recreational equipment, including weighty objects such as a scuba tank. As is illustrated in FIGS. 2A and 2B; however, the problem of placing a heavy load on the user has not been addressed.

Similarly, U.S. Pat. No. 5,492,346 issued to Stadler, et al provides a container with a cavity on wheels and with a handle. Stadler places weighty objects on the exterior surface of the container. Still, and as is true for the other devices in the art, the load of the weighty object is placed on the user, as illustrated by FIGS. 2C and 2D. (FIG. 2b) These prior art devices are tiresome for the user to transport due to the weight of objects being transported. Weighty objects are placed on these devices such that the weight is not well distributed and is fully borne by the user. Thus, transporting recreational equipment using these prior art devices can become tiresome, particularly so when the recreational equipment is transported for a long distance or over difficult terrain.

There is a need in the art for a recreational equipment toting device that is not burdensome to use and that is not laborious to us by placing a weighty load on the user.

SUMMARY OF THE INVENTION

One embodiment of the present invention relates to a recreational equipment tote device that is easy to use and that distributes the weight of objects loaded on said tote such that the user can transport said tote without bearing the weight of the objects attached thereto. The tote device of the current invention distributes the weight of the recreational equipment so that the full weight of said recreational equipment is not being borne by the user.

In one particular aspect of the present invention, the tote device comprises a compartment for storing of recreational equipment and a strategically located holding mechanism for placing weighty objects. The compartment comprises a cavity and access to said cavity from outside of the compartment allows easy access to the cavity by the user for the placement of recreational equipment. The strategically located holding mechanism is preferably a platform attached outside of the compartment. When a weighty object is placed on the strategically located holding mechanism and the tote device is in position for transporting the recreational equipment to a remote location, the strategic placement of the weighty recreational equipment will act to reduce the weight burden for the user.

In one embodiment, the tote device is useful for transporting scuba equipment to a remote location. In the preferred embodiment, the device comprises a strategically located holding mechanism that is a platform attached to the exterior of the device container, and a weighty object such as a scuba tank is secured thereto. When using the inventive device, the container is tipped along its wheel axis by applying an upward force to the handle, which is also attached to the container opposite the wheel axis from the platform. Because of the strategic placement of the platform, the downward force of the weighty object works to the user's benefit in applying upward force to the handle when positioning the tote device for transport.

Another embodiment of the present invention consists of using the tote device for other outdoor sports, including, but not limited to, the sport of paintball. One aspect of this embodiment is using the device container to hold the items utilized in the sport of paintball including but not limited to face and body protection, paintball supplies and accessories, guns and ammunition. For example, the platform in the rear of the device container could be used to carry the air cylinders used by the sport's participants to fill the paintball guns with air. This aspect could be used during the course of the sport, as the air cylinders are commonly used on the playing field as remote fill stations for participants' guns. The retractable handle and the wheels of the tote device make it uniquely qualified to serve the participants in the sport of paintball. Another aspect of this embodiment involves modification of the cavity of the device to hold specific equipment or supplies, as the user sees fit. Specifically, the cavity can be compartmentalized to accommodate differing amounts of equipment or supplies, thereby customizing relative to individual use. An example of this could be observed by placing the air cylinders in the strategically located holding platform, while the remaining interior cavity of the container is compartmentalized to hold the paintballs separately from the paintball gun and any protective face and body wear.

DETAILED DESCRIPTION OF THE INVENTION

The tote device of the current invention is described in relation to the accompanying figures.

Figure 1A:
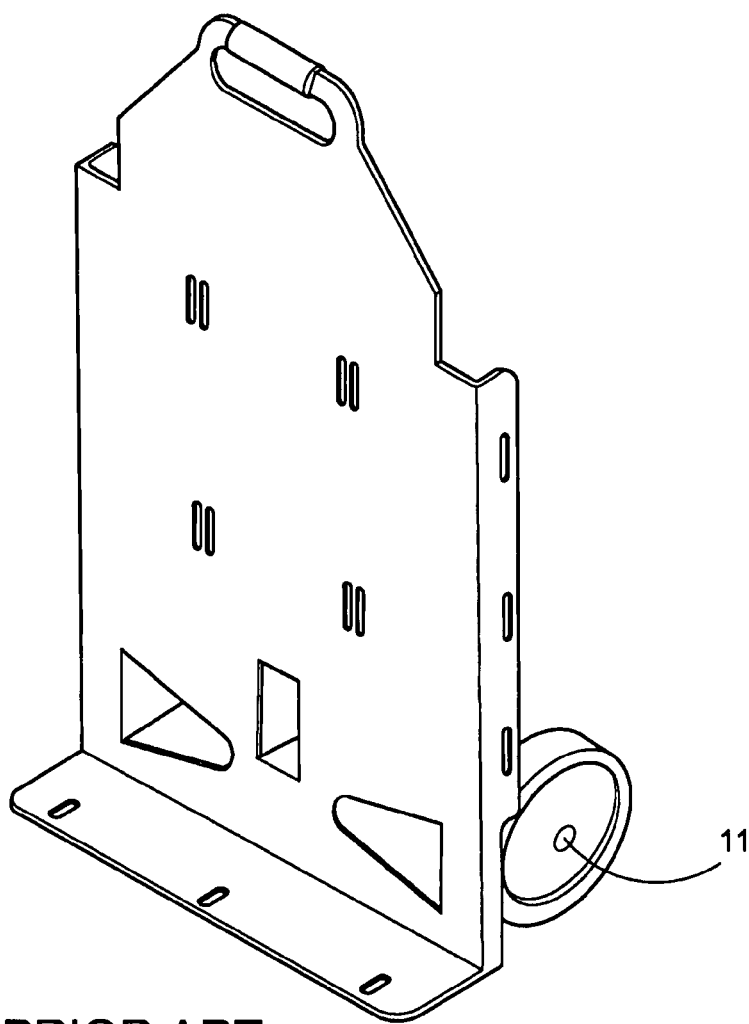
FIGS. 1A and 1B show a scuba tote device of the prior art wherein the user must strap the gear box and scuba tank to the device and will bear the full weight of the 60 pound scuba tank during transportation, as indicated by the relationship of the load indicating arrows to the pivot point.
Figure 1B:
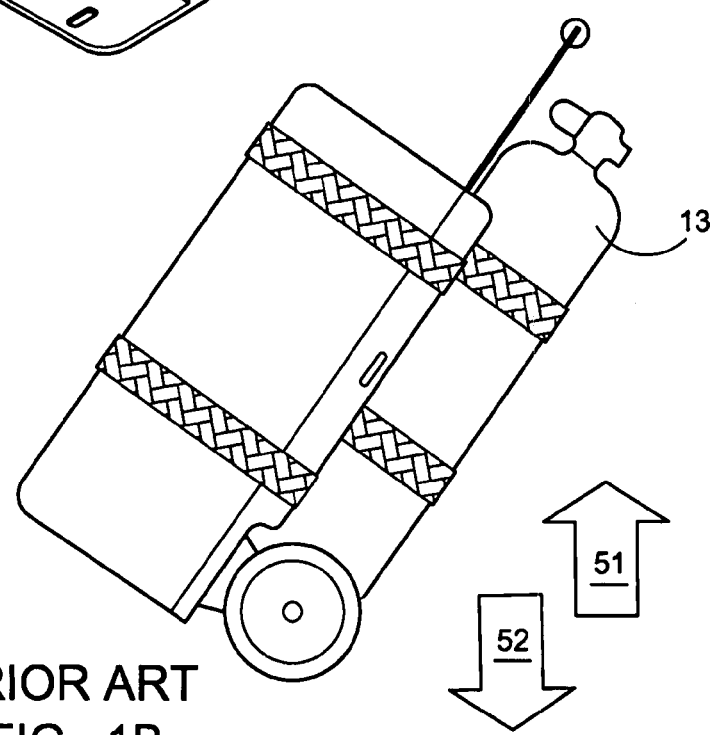
Figure 2A:
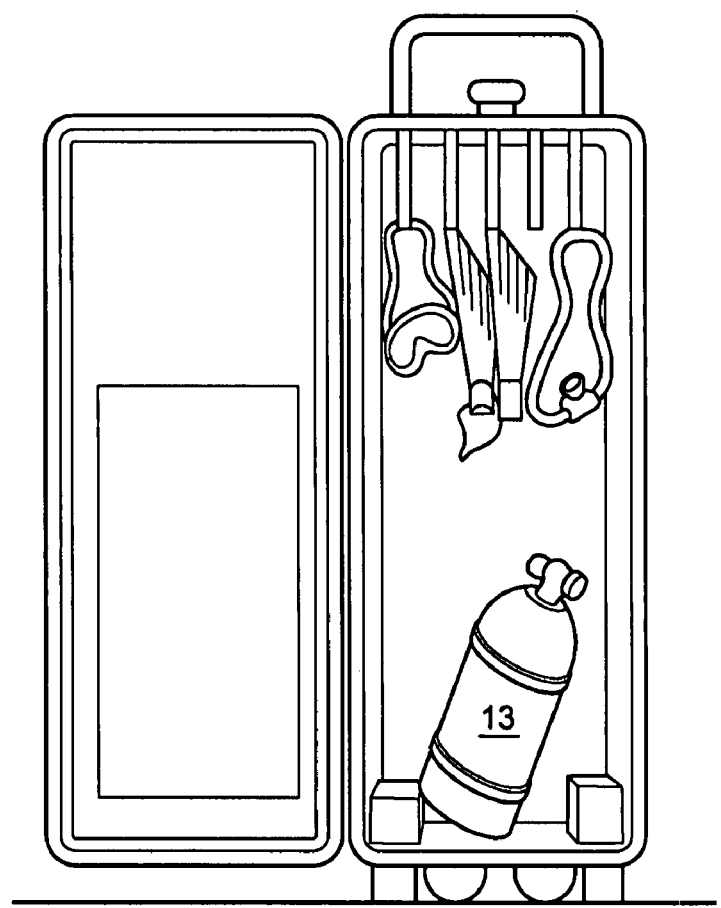
FIGS. 2A and 2B illustrate front and side views of a scuba tote device wherein the user will bear the full weight of the of the 60 pound scuba tank during transportation, as indicated by the relationship of the load indicating arrows to the pivot point.
Figure 2B:
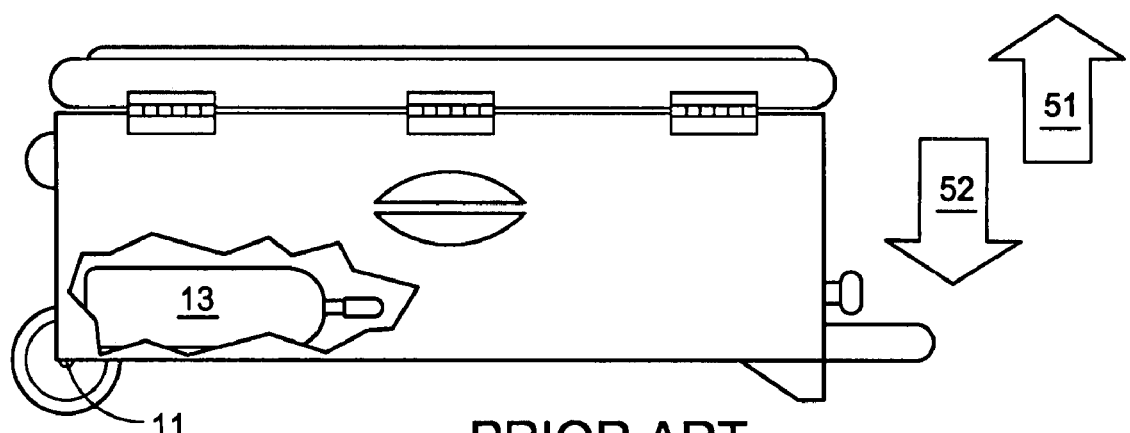
Figure 2C:
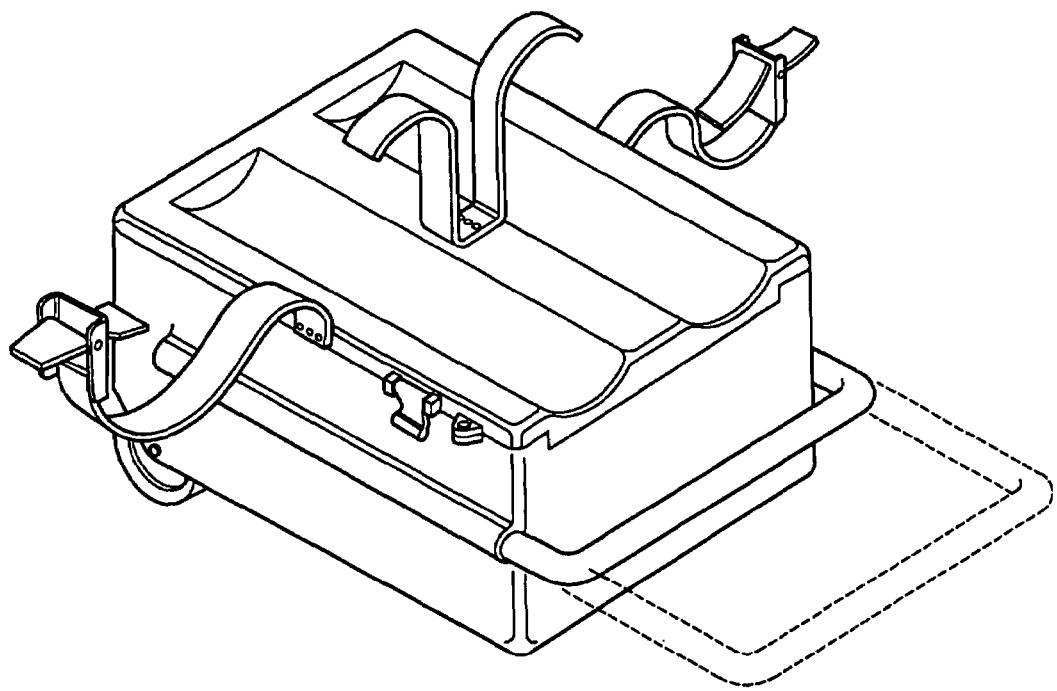
FIGS. 2C and 2D are perspective and side views of another scuba tote device in the prior art.
Figure 2D:
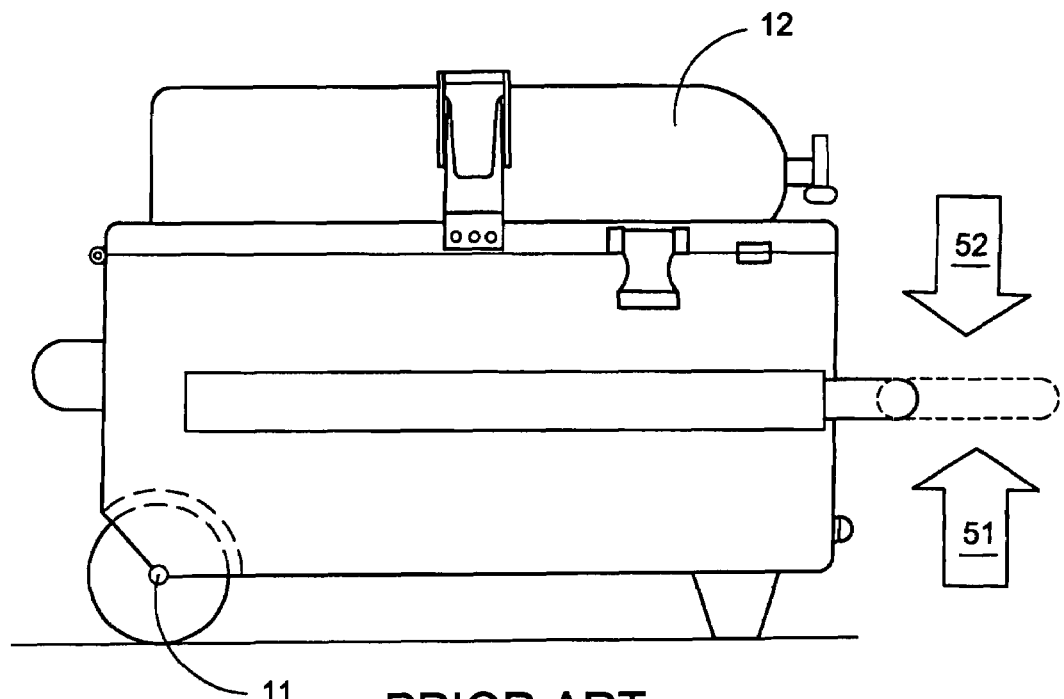
Figure 3A:
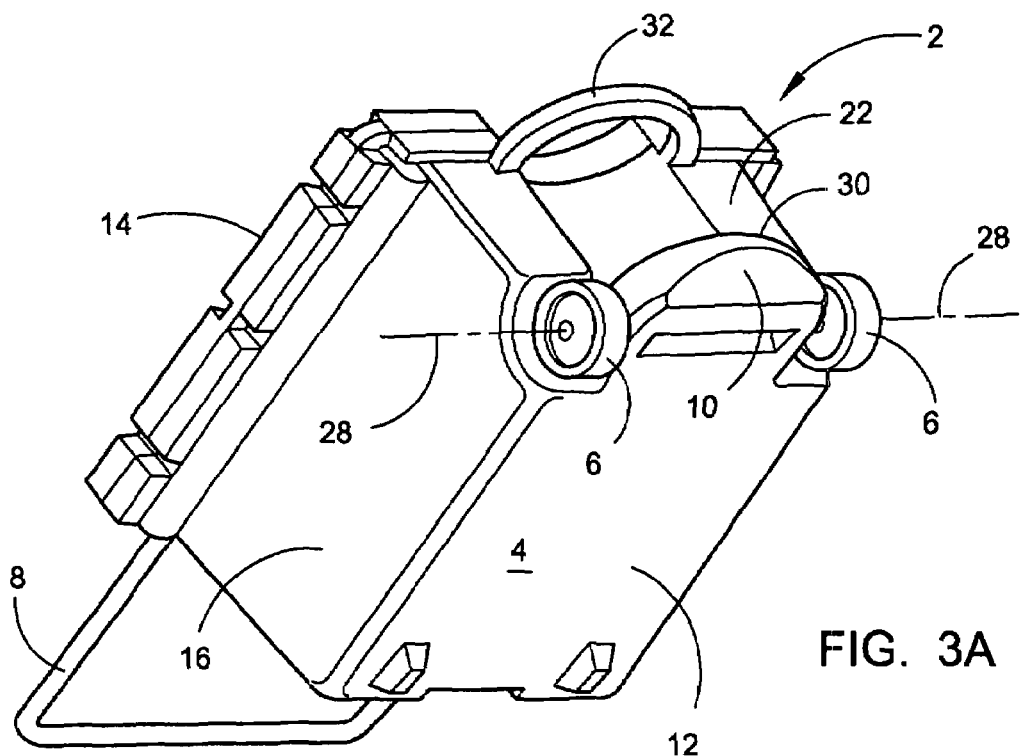
FIGS. 3A and 3B illustrate a preferred embodiment for a design of a tote device of the current invention.
Figure 3B:
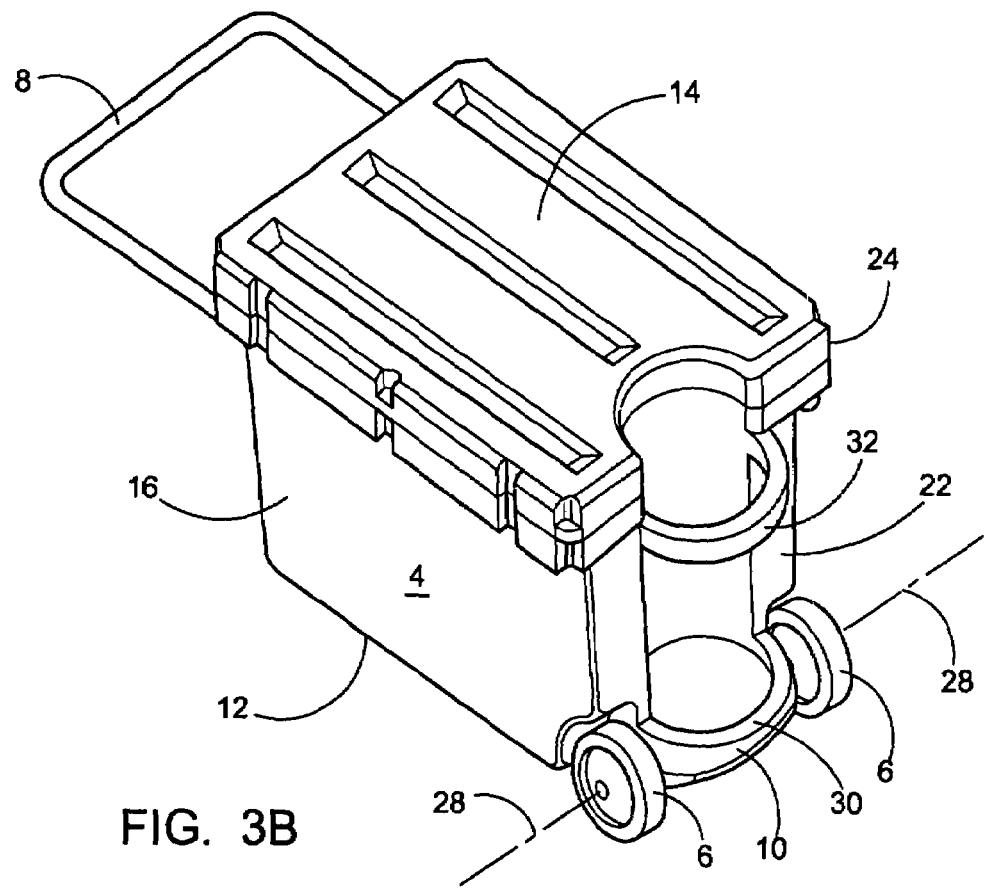

The preferred embodiment is generally illustrated by FIGS. 3A and 3B. The recreational equipment tote device 2 of the preferred embodiment is used for transporting weighty recreational equipment to a remote location. Weighty recreational equipment includes, but is not limited to, scuba gear and paintball gear. The tote device 2 comprises a body 4, wheels 6, a handle 8, and a strategically located platform 10 for the placement of weighty objects.

Figure 4A:
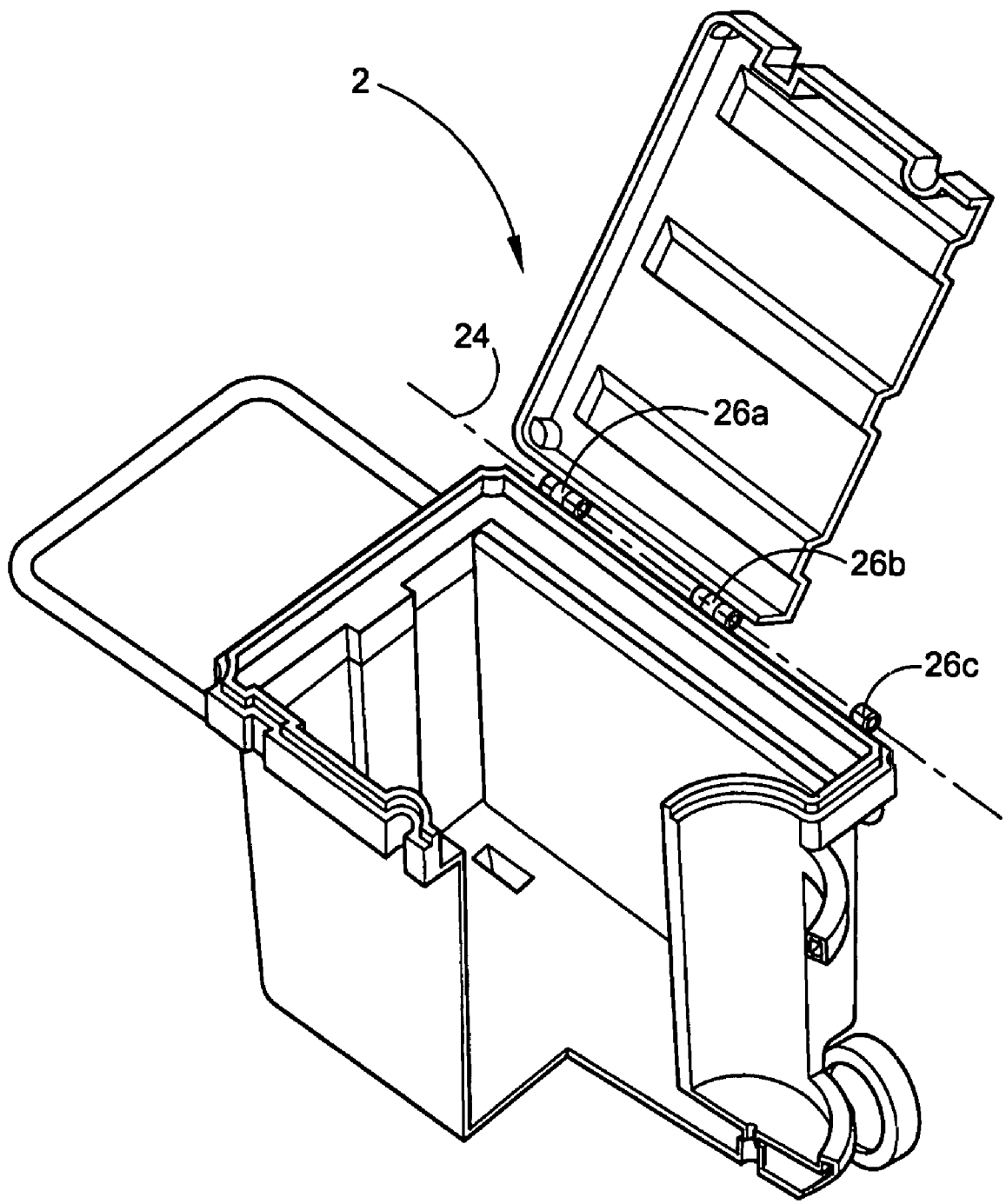
FIGS. 4A and 4B are cut away and perspective views of the invention in its preferred embodiment illustrating the cavity of the device's body and the hingedly attached member of the device's body useful for accessing said cavity.
Figure 4B:
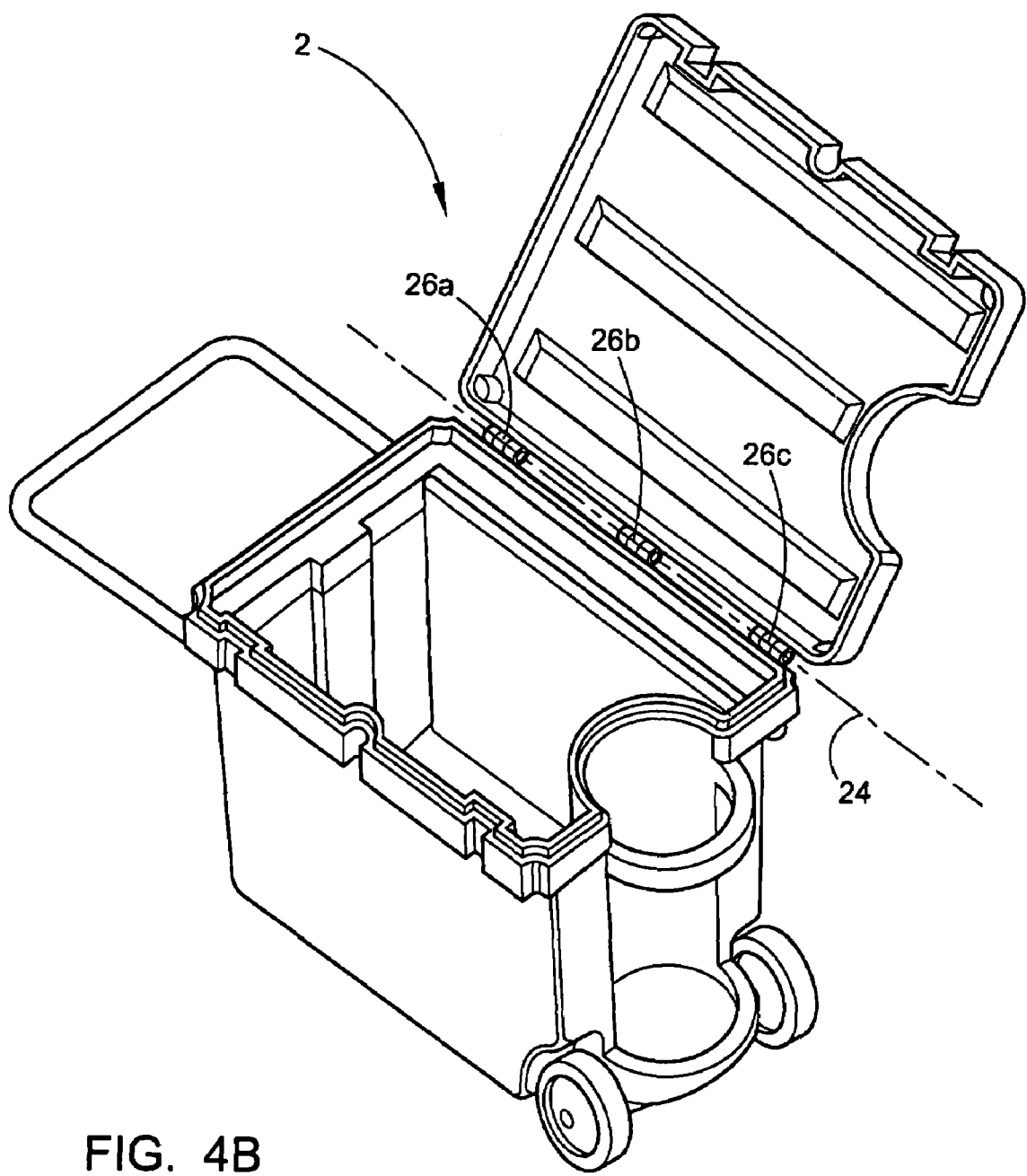

The body 4 of the current invention can be any means useful for securely holding recreational equipment. Preferably, body 4 is a container having a base member 12, a top member 14, a first side member 16, a second side member 18 (FIG. 4B), a front member 20 (FIG. 4B) and a back member 22. The aforesaid members 12-22 forming body 4 are arranged to form a cavity for holding objects. The cavity of body 4 is accessible by the user, and in the preferred embodiment, top member 14 is hingedly attached to second side member 18, thereby allowing top member 14 to rotationally pivot around the hinged axis 24. The cavity of body 4 and the hinged axis 24 are better illustrated FIGS. 4A and 4B. One of ordinary skill in the art will readily employ a variety of hinge mechanisms to for the hinged axis 24 of body 4 without exceeding the scope of the current invention. In the preferred embodiment, the hinged axis comprises three evenly spaced hinges 26a-c.

Optionally, body 4 can have a drain spout to prevent water and other liquids from stagnating within the cavity of tote device 2. Preferably, the drain spout is located in the lower sections of body 4, such as in base member 12 or in the sections of members 16, 18, 20 or 22 near where these sections meet with base member 12, thereby allowing for complete draining. An additional advantage of having a drain spout in the body 4 of tote device 2 is that the tote device can be used for rinsing recreational equipment following use. For example, scuba dive equipment will have a layer of sand and sea-salt following use. A user can place the dive equipment into the cavity of body 4 of tote device 2 and can run a stream of fresh water over the dive equipment. The fresh water can run out of the drain spout in body 4, taking the sand and sea-salt along with it. As a further example, the face and body protective wear used during a paintball match will have paint on the wear. A user can place the wear in the cavity of body 4 of tote device 2 and can run a stream of fresh water over the wear. The rinse water can run out of the drain spout in body 4, taking the paint along with it.

Body 4 is preferably formed of a reinforced plastic material. The reinforced plastic material may comprise fiberglass, KEVLAR or other suitable material. Alternatively, the plastic can be reinforced by employing thicker material, a honeycomb design, or strategically located ribs. A combination of fiber reinforcing with selectively located ribs and a honeycomb design may provide maximal strength while reducing the weight of the tote device 2. Base member 12 is also preferably formed of a fiber reinforced plastic material.

Wheels 6 are at least one wheel and preferably two or more wheels, and are attached to body 4 allowing for movement of tote device 2. In a preferred embodiment, wheels 6 are attached to body 4 at the junction of base member 12 and back member 22. In this embodiment, wheels 6 are placed so that the longitudinal wheel axis 28 runs parallel with said junction between base member 12 and back member 22. (FIGS. 3A and 3B) Wheel axis 28 provides a pivot point for rotationally positioning tote device 2. Thus, body 4 pivots along wheel axis 28 to readjust the angle between the ground and base member 12 when placing the tote device 2 back and forth between a resting position and a transporting position. (FIG. 5) Wheel axis 28 and wheels 6 are also useful for transportation of the tote device 2. When the tote device is pivoted along wheel axis 28 such that only wheels 6 contact the ground, then wheels 6 are used for transporting tote device 2 to a remote location.

Handle 8 is used to pivot tote device 2 along wheel axis 28, and when tote device 2 is in a position for transporting handle 8 is also used for tugging tote device 2. In the preferred embodiment, handle 8 is attached to front member 22 proximate the junction where front member 22 meets top member 14. (FIG. 4) (FIG. 3B). In an alternative embodiment, handle 8 connects with front member 22 proximate the junction where front member 22 and base member 12 meet. Handle 8 preferably comprises a steel or aluminum tube having a diameter approximately 1.5 inches, and may further comprise a retraction means to allow for the extension of handle 8 during use and the retraction of handle 8 during storage. Moreover, the handle 8 should have sufficient strength to allow a fully loaded tote device 2 to be tilted upwards and pulled or pushed to the desired location. The greatest stress will typically be applied when the tote device 2 is pulled or pushed through soft sand or mud, or along some other irregular surface.

Figure 5:
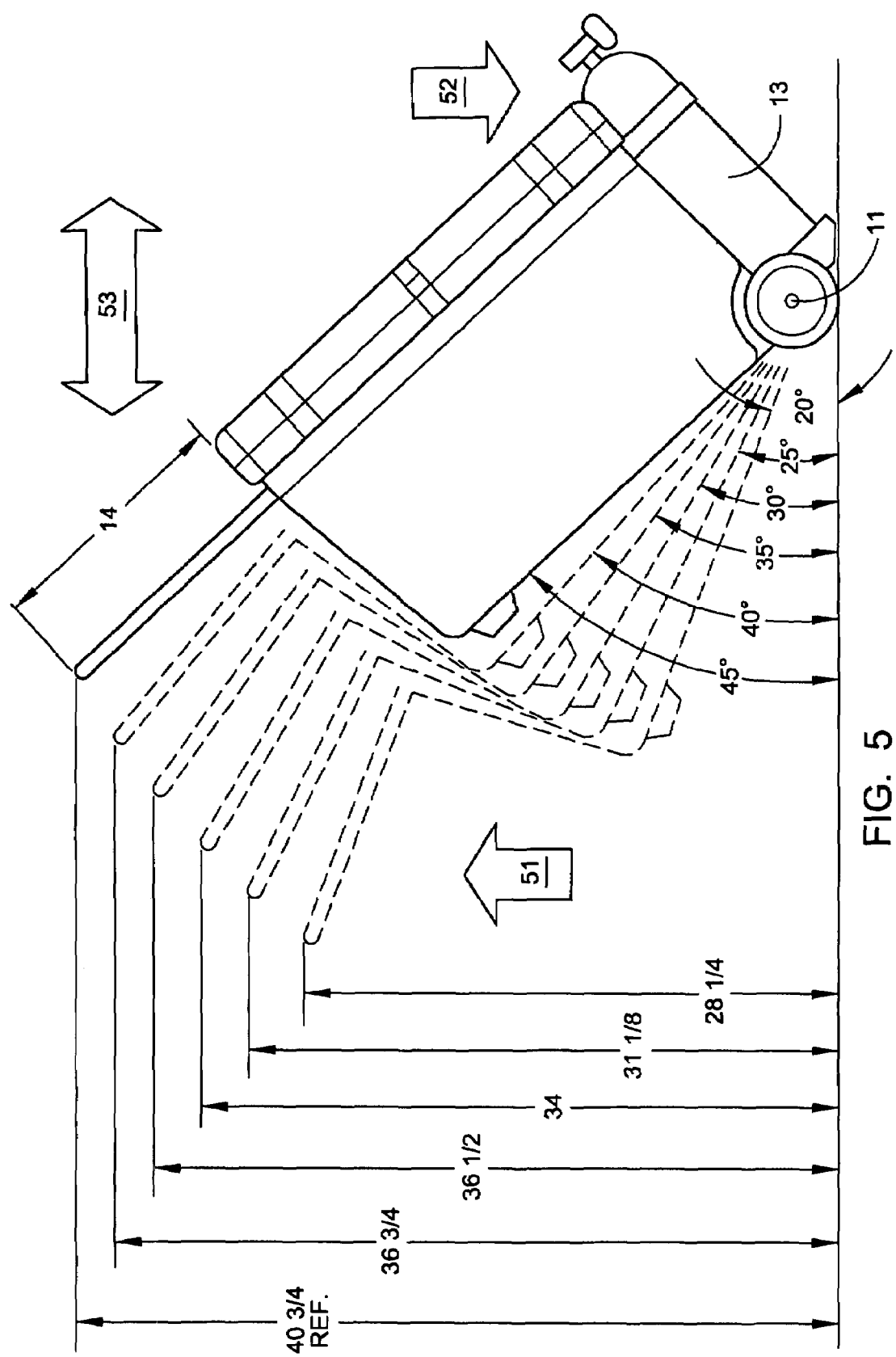
FIG. 5 illustrates the pivot point of the preferred embodiment of the invention device and the direction of force in relation to the direction of transporting when using said device and additionally showing the complement of the weight from a weighty object with the lift by a user across the pivot point of the device thereby reducing the weight load borne by the user during transporting.

As is further illustrated in FIG. 5, when an upward force is applied to handle 8, the body 4 of tote device 2 will pivot along wheel axis 28. The greater the distance between handle 8, and the ground, the greater the angle that is formed between base member 12 of body 4 and the ground. Pivoting tote device 2 along wheel axis 28 places tote device 2 in a position for transporting.

Platform 10 is strategically located on tote device 2 to allow the placement of weighty objects on or in tote device 2 on an arrangement that reduces the weight burden on the user during transportation of tote device 2. In the preferred embodiment, platform 10 comprises a flat shelf member 30 and an object support member 32. In the preferred embodiment wherein the weighty object is an air or gas tank, such as a scuba tank, flat shelf member 30 is located proximate the junction formed between base member 12 and rear member 22 and has a rounded shape with a lip area to snugly hold the bottom of the scuba tank. Object support member 32 is also located on rear member 22 is a position to give support to the mid section of the scuba tank. Object support member 32 is preferably fixedly attached to rear member 22; however, other configurations are obvious to those of ordinary skill in the art. For example, object support member 32 may be hingedly attached to the rear member 22 on one side, and removably attached to the rear member on a second side. In this alternative configuration, object support member 32 will swing open to accept a scuba tank, and once the scuba tank is properly placed on tote device 2, object support member 32 will swing shut, latching to rear member 22 and securing the body of a scuba tank into position. In the preferred embodiment wherein object support member 32 is fixedly attached on both ends, a scuba tank is slid through the shaft of object support member 32 and will rest on the flat shelf 30, securely supported by the lip of flat shelf 30.

The platform 10 in the preferred embodiment is positioned on body 4 of tote device 2 opposite wheel axis 28 from handle 8. In this preferred configuration, the weight of an air tank (e.g., scuba tank) is distributed so that when a user applies upward force to handle 8 in preparation for transporting tote device 2, the downward force of the weighty scuba tanks works to the user's advantage. As further illustrated in FIG. 5, the upward force 51 applied by the user and the downward force 52 applied by the weight of the scuba tanks work in compliment to each other. The overall effect of this strategic placement of the scuba tanks relative to the handle 8 is that the load burden borne by the user is lessened. The effects of this benefit are increasingly appreciated by the user who is transporting the loaded tote device over a long distance or over rough or difficult terrain. This is a substantial improvement over the devices of the prior art, which place the entire load on the user, thereby making transporting a full load tiring, and in some cases impossible. Though in the preferred embodiment the invention is described wherein the tote device is used for an activity having air tanks (e.g., scuba diving, paintball and etc.), the invention is not limited to use in these activities only. Those of ordinary skill in the art will recognize the versatility of this invention and use it in a variety of different activities. Arrows 53 illustrate the direction of transport.

Figure 6A:
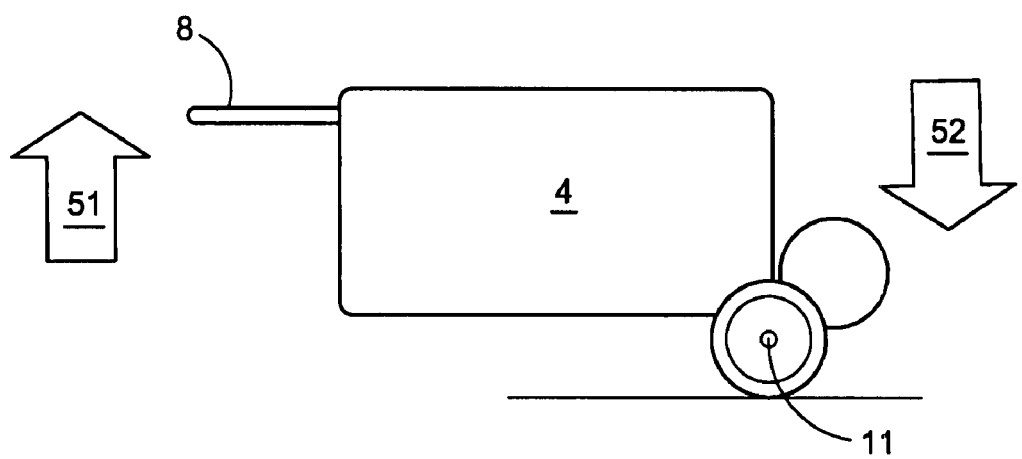
FIGS. 6A-6C illustrate some of the alternative embodiments of the current invention.
Figure 6B:
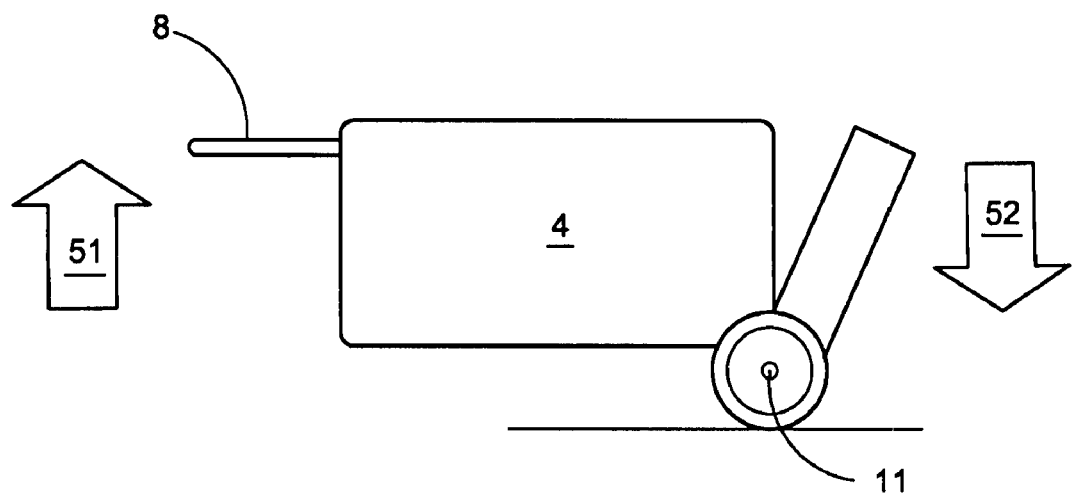
Figure 6C:
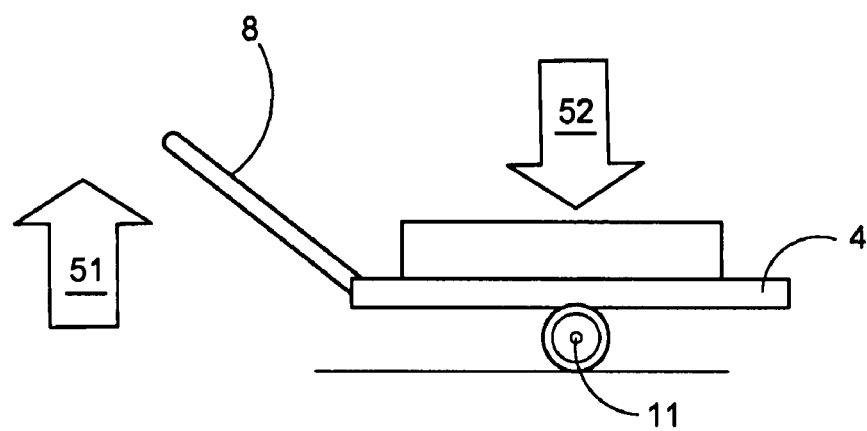

Placement of recreational equipment in or on a tote device in such a manner as to distribute the weight of said recreational equipment and thus lessen the weight burden of transportation for the user is a particular advantage the current invention has over the prior art. The distribution of the weight of this recreational equipment can be achieved by a variety of means, all within the spirit of the current invention. By way of example only, and not limitation, platform 10 could be configured to accept air tanks in a variety of alternative positions, including but not limited to horizontal to the wheel axis 28 and behind said wheel axis 28, or angling away from body 4. (FIGS. 6A and 6B respectively) Alternatively, weighty objects could be evenly distributed across wheel axis 28. (FIG. 6C) Depending on the shape of the weighty object, the configuration of the tote device and the preference of the users, those of ordinary skill in the art will readily make these and other embodiments given the disclosure of the current invention.

In one preferred method of use, a user will load scuba equipment such as a wet suit, mask and fins into the cavity of body 4 of tote device 2. The user will load a scuba tank onto platform 10 by sliding the scuba tank through the shaft created by object support member 32 until the base of the scuba tank is resting on flat shelf 30 and is supported by the lip of said flat shelf 30. Once the scuba equipment is loaded in and on tote device 2, the user will grasp handle 8 and will apply an upward force to handle 8 causing body 4 to rotationally pivot around wheel axis 28. The upward force caused by lifting from the user is complimented by a downward force on the opposite side of wheel axis 28 caused by the weight of the scuba tanks. The pivoted tote device 2 is transported to a remote location via a lateral tug by the user. The tote device 2 is transported over a variety of terrains and distances with greater ease than the scuba totes of the prior art because the user is not fighting the terrain and the weight of the heavy scuba tanks.

In another preferred method of use, the tote device is used for other outdoor sports, including, but not limited to, the sport of paintball. The user will place item such as paintballs, paintball gun(s), protective face and body wear and other items into the cavity of body 4. One alternative embodiment, particularly useful herein is compartmentalization of the cavity of body 4 such that the paintballs, the paintball gun and any protective face and body wear are all held in separate compartments of the cavity of body 4. One advantage of this compartmentalization is organization of the sporting goods. Another advantage is that the protective face and body wear can be separated from the gun(s) and paintballs allowing the protective wear to be washed clean after play while keeping the gun and paintballs dry. In this aspect, the body 4 should have a drain as described above and the drain is preferably located in the compartment holding the protective gear. Of course, all compartments can have a separate drain, thus allowing for cleaning of the tote device. Further in this method of use, the platform in the rear of the device container is used to carry the air cylinders used by the sport's participants for filling the paintball guns with air. Air cylinders are commonly used on the playing field as remote fill stations for participants' guns. The retractable handle and the wheels of the tote device make it uniquely qualified to serve the participants in the sport of paintball. A user can easily tote the air refill tanks about the playing field, thus providing a readily available fill station. Further, the device allows the user to easily bring and remove all of the equipment to the field of play.

While the particular device and method for transporting recreational equipment herein shown and described in detail are fully capable of attaining the above described objects of the this invention, it is to be understood that the description and drawings presented herein represent one embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims. It should be noted that steps recited in any method claims below do not necessarily need to be performed in the order that they are recited. Those of ordinary skill in the art will recognize variations in performing the steps from the order in which they are recited. The accompanying claims should be constructed with these principles in mind.

I claim:

1. A tote device for storing and transporting recreational equipment, the tote device comprising:
   a. a body;
   b. a handle;
   c. one or more wheels defining a wheel axis; and
   d. a platform configured adjacent to the body of the tote device and designed for the placement of a weighty object to be transported by the tote device, wherein said platform and the weighty object are placed substantially over the wheel axis to reduce the weight burden of transporting the weighty object.

2. The tote device of claim 1, wherein the body is a container further comprising a base member, a top member, first side member, a second side member, a front member and a back member, arranged to form an interior space.

3. The tote device of claim 2, wherein the container has at least one opening for accessing the interior space.

4. The tote device of claim 3, wherein the opening for accessing the interior space comprises a hinged connection for attaching the top member to a member selected from the group consisting of: first side member, second side member, front member and back member.

5. The tote device of claim 1, wherein the handle is connected to the front member of the body.

6. The tote device of claim 1, wherein one or more wheels are connected to the base member of the body.

7. The tote device of claim 1, wherein the platform is attached to the junction of said body where the base member and the rear member meet, and wherein the platform comprises a flat shelf member having a lip and an object support member wherein the flat shelf member having a lip and the object support member are used to secure the weighty object.

8. The tote device of claim 1, wherein one or more wheels are attached to the base member of the body, the handle is attached to the front member of the body proximate the end of said front member connecting with the top member, and the platform is attached to the base member of the body on the end of the base member connecting with the back member and opposite the axis formed by one or more wheels from the handle attachment position.

9. The tote device of claim 8, wherein the platform and the handle are attached to the tote device body on opposite sides of the one or more wheel's axis to facilitate transportation of a weighty object.

10. The tote device of claim 1, wherein the platform and the handle are attached to the tote device body on opposite sides of the one or more wheel's axis to facilitate transportation of a weighty object.

11. The tote device of claim 1, wherein the platform is attached to the base member and juts out from said base member forming a right angle with the back member.

12. The tote device of claim 1, wherein the base member further comprises a drain outlet for the elimination of water and other fluids trapped in the interior space of the container.

13. The tote device of claim 1, wherein the recreational equipment includes a weighty object that is at least one air tank, and wherein the air tank is placed on the platform, the remaining recreational equipment is placed in the cavity of the body and the handle is located opposite the wheel base from the platform and is used to tug the tote device for transportation.

14. A method for transporting recreational equipment across a variety of terrains to a remote location using a tote device, the method comprising the steps of:
   a. placing weighty objects on a platform member of a tote device to minimize the weight burden of said weighty objects during transporting, the weighty objects positioned substantially over a wheel axis;
   b. positioning the tote device by lifting on a handle to pivot the tote device along the wheel axis; and
   c. applying horizontal force to the handle of the tote device to cause the transporting of the recreational equipment.

15. The method of claim 14, wherein the step of placing weighty objects on the platform includes placing air tanks on said platform.

16. The method of claim 15 wherein the air tank is used in a sport comprising scuba.

17. A method for attaching weighty recreational equipment to a tote device comprising attaching weighty recreational equipment to the tote device on the opposite end of the tote device from an attachment of a handle of said tote device thereby causing a balance across the wheel axis of said tote device.

18. A method for transporting recreational equipment comprising positioning the weight of said recreational equipment across a wheel axis when the tote device is in a position for transporting to lessen a user's burden in transporting said recreational equipment.

19. The method for transporting the recreational equipment of claim 18, wherein positioning the weight includes placing weighty objects on a side of the tote device that is opposite substantially over the wheel axis and opposite from the placement of the handle on said tote device.

20. The method for transporting the recreational equipment of claim 18, wherein the positioning comprises applying an upward force to the handle and the weight of the weighty object applies a downward force and the tote device is pivoted along the wheel axis.

21. The method for transporting the recreational equipment of claim 18, wherein a downward force of the weighty object eases a user's burden in transporting the recreational equipment by transferring across a pivot point formed by the wheel axis resulting in an upward force at the handle, thereby reducing the total weight load borne by said user.

22. The method for transporting the recreational equipment of claim 18, wherein the tote device is used for a recreation comprising scuba and the weighty object is one or more air tanks.

* * * * *